United States Patent [19]

Iribarne et al.

[11] 4,300,044

[45] Nov. 10, 1981

[54] METHOD AND APPARATUS FOR THE ANALYSIS OF CHEMICAL COMPOUNDS IN AQUEOUS SOLUTION BY MASS SPECTROSCOPY OF EVAPORATING IONS

[76] Inventors: Julio V. Iribarne, 29 Banstock Dr., Willowdale, Ontario, Canada, M2K 2H5; Bruce A. Thomson, 144 Lake Promenade, Toronto, Ontario, Canada, M8W 1A5

[21] Appl. No.: 147,485

[22] Filed: May 7, 1980

[51] Int. Cl.[3] .............................................. B01D 59/44

[52] U.S. Cl. .................................... 250/282; 250/288

[58] Field of Search ............... 250/281, 282, 288, 423, 250/425, 290; 73/61.1 C, 23

[56] References Cited

U.S. PATENT DOCUMENTS

| | | | |
|---|---|---|---|
| 3,944,826 | 3/1976 | Gray | 250/288 |
| 4,137,750 | 2/1979 | French et al. | 250/288 |
| 4,189,640 | 2/1980 | Dawson | 250/290 |
| 4,214,158 | 7/1980 | Schmidt | 250/288 |

OTHER PUBLICATIONS

"On the Evaporation of Small Ions from Charged Droplets" *J. of Chem. Physics,* Iribarne et al., vol. 64, No. 6 Mar. 76.

"The Fate of Electrical Charges in Evaporating Cloud Droplets", Thomson et al., *Rev. of Geophysics and Space Physics,* vol. 16, No. 3, Aug. 1978.

*Primary Examiner*—Bruce C. Anderson

*Attorney, Agent, or Firm*—James R. Hughes

[57] ABSTRACT

A method for analysis of chemical compounds comprising forming a fine droplet spray of a solution containing the compound to be detected and analyzed, electrically charging the spray droplets and allowing said spray to evaporate such that either ionized molecules or atoms of the compound of interest or the neutral species attached to another ion are ejected into the air introducing the ions which may or may not be clustered with neutral solvent molecules into an analyzer, and obtaining a read-out indicative of the chemical compound is obtained.

5 Claims, 7 Drawing Figures

METHOD AND APPARATUS FOR THE ANALYSIS OF CHEMICAL COMPOUNDS IN AQUEOUS SOLUTION BY MASS SPECTROSCOPY OF EVAPORATING IONS

This invention relates to a method and apparatus for the analysis of chemical compounds in solution by mass spectroscopy of evaporating ions.

The use of mass analyzers such as mass spectrometers for the analysis of sample components such as gaseous ions is well known. The following is a group of typical patents in this field:

| | | |
|---|---|---|
| 3,639,757 | Caroll et al | Feb. 1, 1972 |
| 3,944,826 | A.L. Gray | Mar. 16, 1976 |
| 4,023,398 | French et al | May 17, 1977 |
| 4,189,640 | Dawson P. H. | Feb. 19, 1980 |

Many substances produce ions when dissolved in water or other solvents. It has been found that when such solutions are atomized into fine droplets and these droplets contain electric charges, during their evaporation the ions present in solution separate from the liquid and go to the gas phase, clustered with a number of neutral molecules. Thus, for example, from a positively charged droplet containing sodium chloride, sodium ions will evaporate with a variable number of water molecules (of the order of 5 to 10). The same also happens with more complicated molecules: quinidine sulfate in the solution will give ions constituted by a quinidine molecule plus a proton that may or may not be clustered with a few water molecules. Some organic molecules will also evaporate as neutral components, clustered with an ion of other substances.

The present invention is concerned with an analytical method and apparatus of great sensitivity using ions produced in the above manner.

Figure 1:
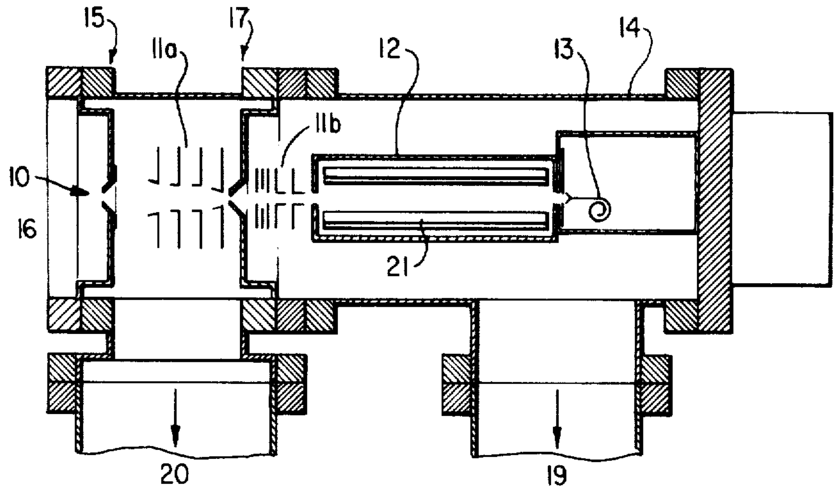
Figure 2:
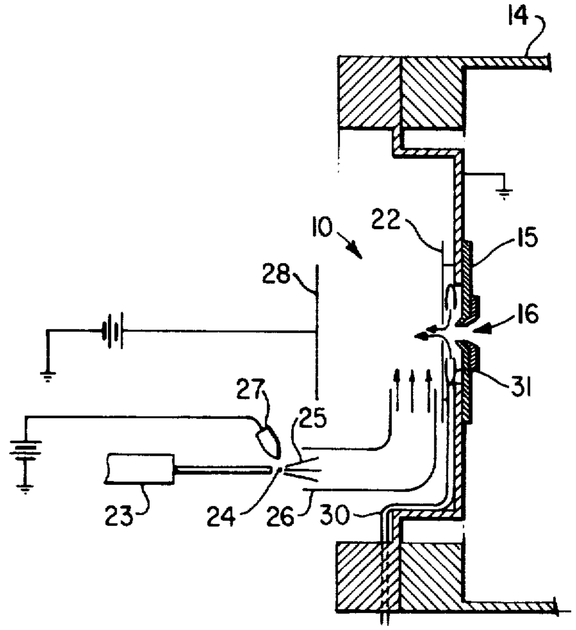

In drawings which illustrate an embodiment of the invention,

FIG. 1 is a schematic of a mass analyzer employing ions produced from a solution, FIG. 2 is a top view of the input portion of the mass analyzer of FIG. 1 showing the method of extraction of ions from the plume of the spray, FIGS. 3, 4, 5, 6 and 7 are experimental mass spectra of certain compounds.

Referring to FIG. 1, a mass analyzer is shown in cross-section and includes a spray region 10, ion lenses 11*a* and 11*b*, a quadrupole mass filter 12, and an electron multiplier 13 connected to an approriate electrical read out, e.g. a CRT, to obtain mass spectra. These elements are housed in a cylindrical vacuum chamber 14. An orifice flange 15 is suitably mounted between spray region and the ion lenses 11 and contains an orifice 16 (e.g. 25 $\mu$m dia.). A second orifice flange 17 is positioned between the lens 11*a* region and the lenses 11*b* associated with the quadrupole mass filter and contains an orifice 18 (e.g. 2 mm dia.). The region containing the quadrupole mass filter is connected to a vacuum pump (not shown) at 19 (e.g. a 6" diffusion pump) and the lens 11*a* region is connected to a vacuum pump (not shown) at 20. These pumps produce a vacuum typically of $10^{-4}$ Torr in the first chamber and $10^{-6}$ Torr in the second (mass filter) chamber. The mass filter is made up of four rods 21 with opposing pairs connected to DC voltage sources and R.F. voltage sources. The construction and operation of the mass filter itself is generally conventional.

The spray region 10 is shown in FIG. 2. The orifice plate 15 containing orifice 16 has a guard plate 22 mounted ahead of it. A compressed air hypodermic needle 23 ejects air past the end of a second hypodermic needle 24 (shown in end view) connected to the solution being analyzed. The hypodermic needles (nozzles) acting as nebulizers or atomizers form an atomizier spray 25 of the liquid that enters elbow tube 26. An induction electrode 27 connected to a high voltage supply (e.g. +3500 V) is mounted adjacent the hypodermic nozzles and is effective in charging electrically the spray droplets. The gaseous ions produced by the evaporating spray travel across orifice 16 and are injected into the mass analyzer through orifice 16 by action of electrode 28 connected to a high voltage supply (e.g. +3500 V). These ions pass through a stream of purified air flowing out of the central hole in plate 22. This air is introduced into the device from a supply through pipe 30 to a doughnut-shaped structure 31 having inwardly facing openings through which the air passes.

Experimental results give mass spectra of certain compounds as follows:

FIG. 3

$10^{-4}$ M Quinidine sulfate $M = C_{20}H_{24}N_2O_2$ (quinidine; M.W. = 324.4)

$W = H_2O$ amu = atomic mass units

The series $MH^+(H_2O)_n$ with n = 1,2, . . . , 8 is clearly visible.

FIG. 4

$2\times10^{-4}$ M Imipramine Chloride $M = C_{19}H_{29}N_2$ (M.W. = 280.2)

$W = H_2O$ $A^+ = NH_4^+$

The series $MH^+(H_2O)_n$ with n = 0,1, . . . , 6 is clearly visible.

To the left, several peaks of $NH_4^+(H_2O)$ are also found ($NH_4^+$ is an impurity in the water).

FIG. 5

$2\times10^{-6}$ M Imipramine chloride $M = C_{19}H_{29}N_2$ (M.W. = 280.2)

$W = H_2O$ $A^+ = NH_4+$

Even at this low concentration, the main peaks $MH^+(H_2O)_n$ are clearly visible. $NH_4^+$ and other impurities give the peaks at the left.

FIG. 6

$10^{-3}$ Picric acid in alkaline solution (NaOH)

$MH = (NO_2)_3.C_6H_2OH$ (M.W. = 229)

$W = H_2O$

The dominant peaks are the series $M^-(H_2O)$ with n = 0, 1, 2, 3. Some of the smaller peaks at the left are produced by the $OH^-$ ion.

FIG. 7

$10^{-3}$ M NaBr + $10^{-3}$ M Acetanilide $M = C_6H_5.NHCO.CH_3$ (M.W. = 135.2)

$W = H_2O$

The series $Na^+.M(H_2O)_n$, with n = 1, 2, 3, 4, 5 is clearly visible, with two large peaks for n = 2, 3. The three large peaks at the left correspond to $Na^+W_4$, $W_5$, $W_6$.

In operation the solution which may or may not be aqueous, containing an ion to be investigated, is atomized into a fine mist. The induction electrode charges the droplets during their production. The droplets pass in front of a small orifice while evaporating. The ions produced by evaporation from the droplets are deflected by an electric field towards the orifice and, through it, enter the vacuum enclosure containing the quadrupole mass spectrometer. The ion beam is focussed by ion lenses and directed, through the mass filter, onto a detector connected to a pulse counting circuit. The mass spectrum is swept continuously for a certain time, and recorded in a multi-channel signal averager. After enough counts have accumulated to obtain a satisfactory signal-to-noise ratio (usually after a time of the order of ten minutes), the spectrum is retrieved and recorded on paper. The ions found in the spectrum are those present in the solution (clustered with water molecules or with other neutral molecules) when they are stable in the gas phase; or else, secondary ions are found, produced by reactions of the primary ions with other molecules before entering the mass spectrograph. Other types of known analyzers might be used e.g. a mobility analyzer.

Several characteristics of the process are pointed out:

(a) The substance to be investigated in at the start in aqueous solution, most usually in ionic form (some neutral molecules also evaporate, clustered with the ions). This fact points already to non-volatile compounds, e.g. to a different range of molecules from those analyzed by existing mass spectrometric methods.

(b) Everything is done at room temperature. There is no possibility of degradation of the molecular ion. The ion appears as such in the spectrum, clustered with neutral molecules (mostly at $H_2O$), or, in some cases, is revealed by secondary products, (c) The molecule is not subject to ionizing radiation.

(d) A limitation lies in that the solution must not contain more than a fraction of a gram of total non-volatile solutes per liter. Investigation of more concentrated solutions would imply a previous extraction to separate the interesting compounds from inert solutes.

(e) A second limitation lies in that the method is only operative with monovalent ions.

The main category of substances to which the method can be applied is that of ionic substances, or substances that are readily amenable to ionic form, either by a change of pH or even by introduction of a proper function into the molecule. This category includes those molecules giving positive and negative ions. Certain neutral molecules can also be investigated.

(a) Compounds containing a positive ion or that can be readily brought into a form containing a positive ion.

Figure 3:
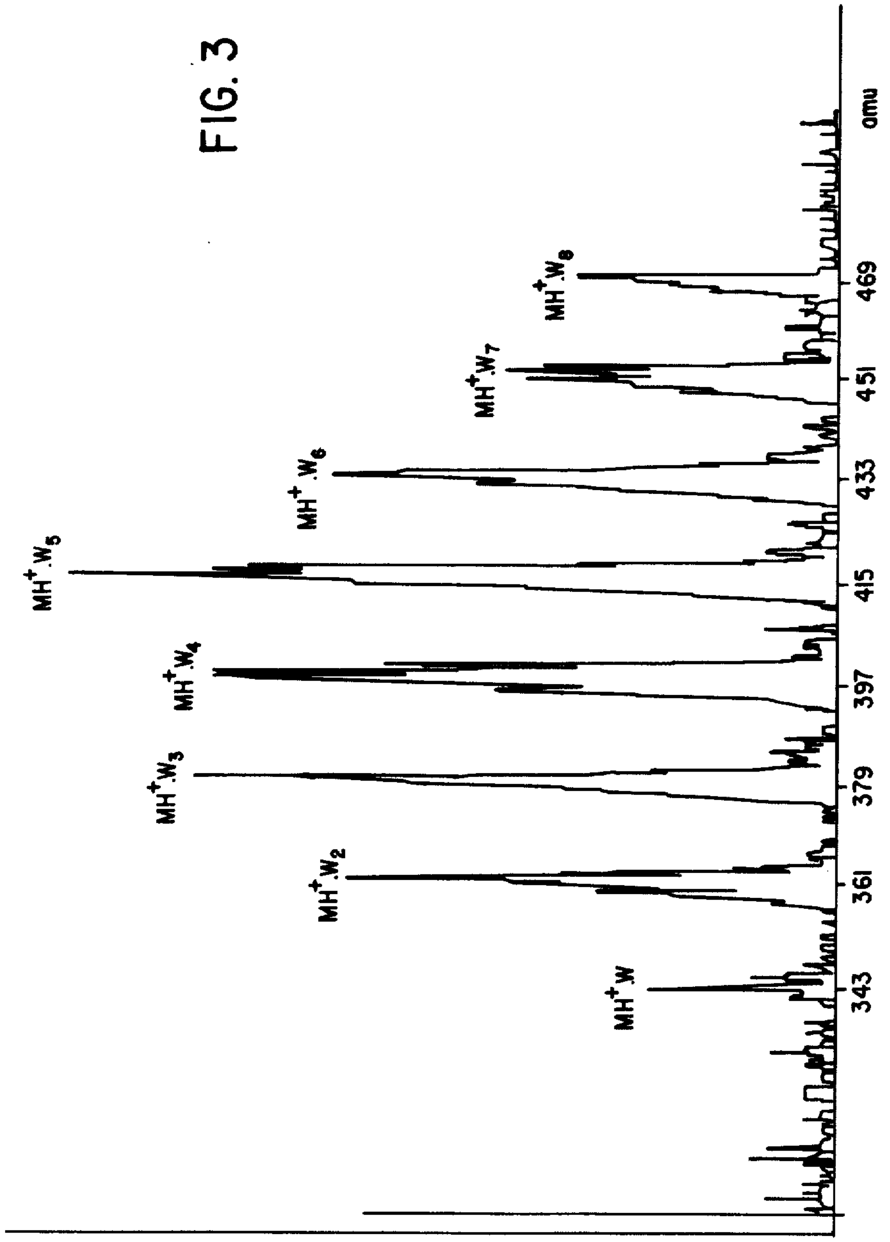

This includes the very wide range of alkaloids. The spectra of the following ions have been inventigated $H^+$ $Li^+$, $Na^+$, $K^+$, $Rb^+$, $Cs^+$ $NH_4^+$ $(CH_3(CH_2)_3)_4N^+$, $(CH_3(CH_2)_4)_4N^+$ As examples of pharmaceutical drugs, the following have been tested:

Quinidine sulfate: see FIG. 3

Figure 4:
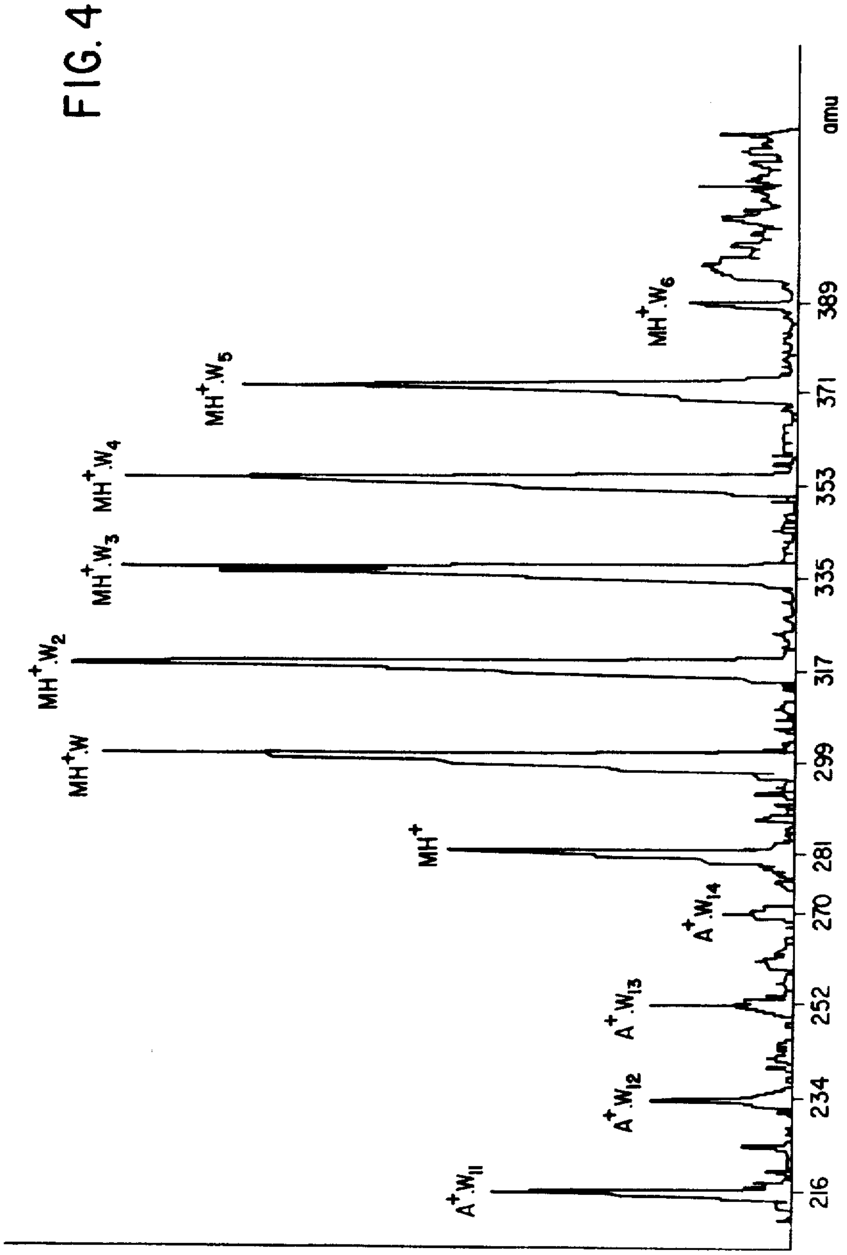
Figure 5:
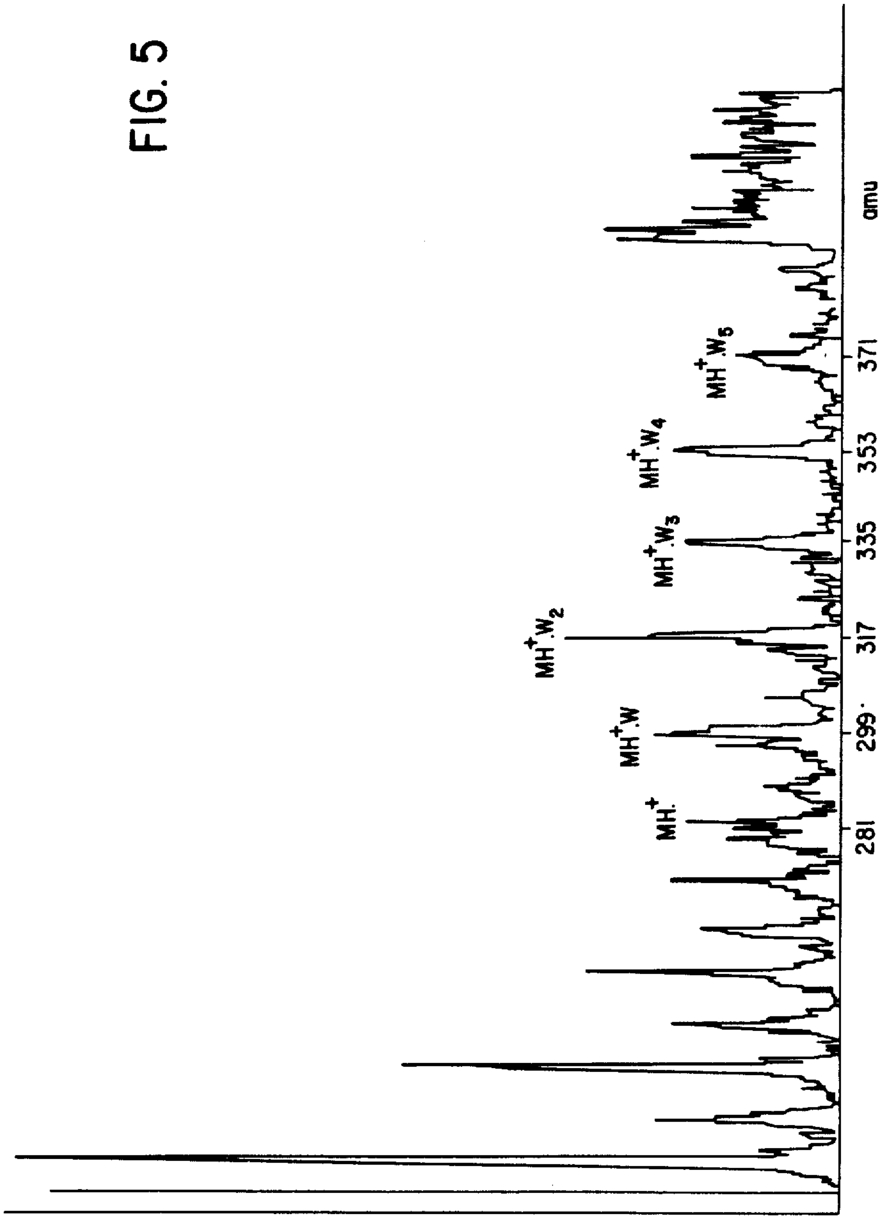

Imipramine: see FIGS. 4 and 5, the second one from a solution of concentration $2\times10^{-6}$ M.

(b) Compounds giving a negative ion, or readily transformable into such type of compounds.

This includes organic compounds with the carboxylic group —COOH, with the sulfonic group —$SO_3H$ and with other acidic groups.

The following ions were studied $OH^-$ $F^-$, $Cl^-$, $Br^-$, $I^-$ $HCO_3^-$, $NO_2^-$, $NO_3^-$, $HSO_4^-$, $ClO_3^-$, $ClO_4^-$, $HCrO_4^-$ $MnO_4^-$, $SCN^-$ $CH_3COO^-$ $CH_2NH_2$—$COO^-$ (glycine, as an example of aminoacid)

$NH_2C_6H_4SO_3H$ (sulfanilic acid)

Figure 6:
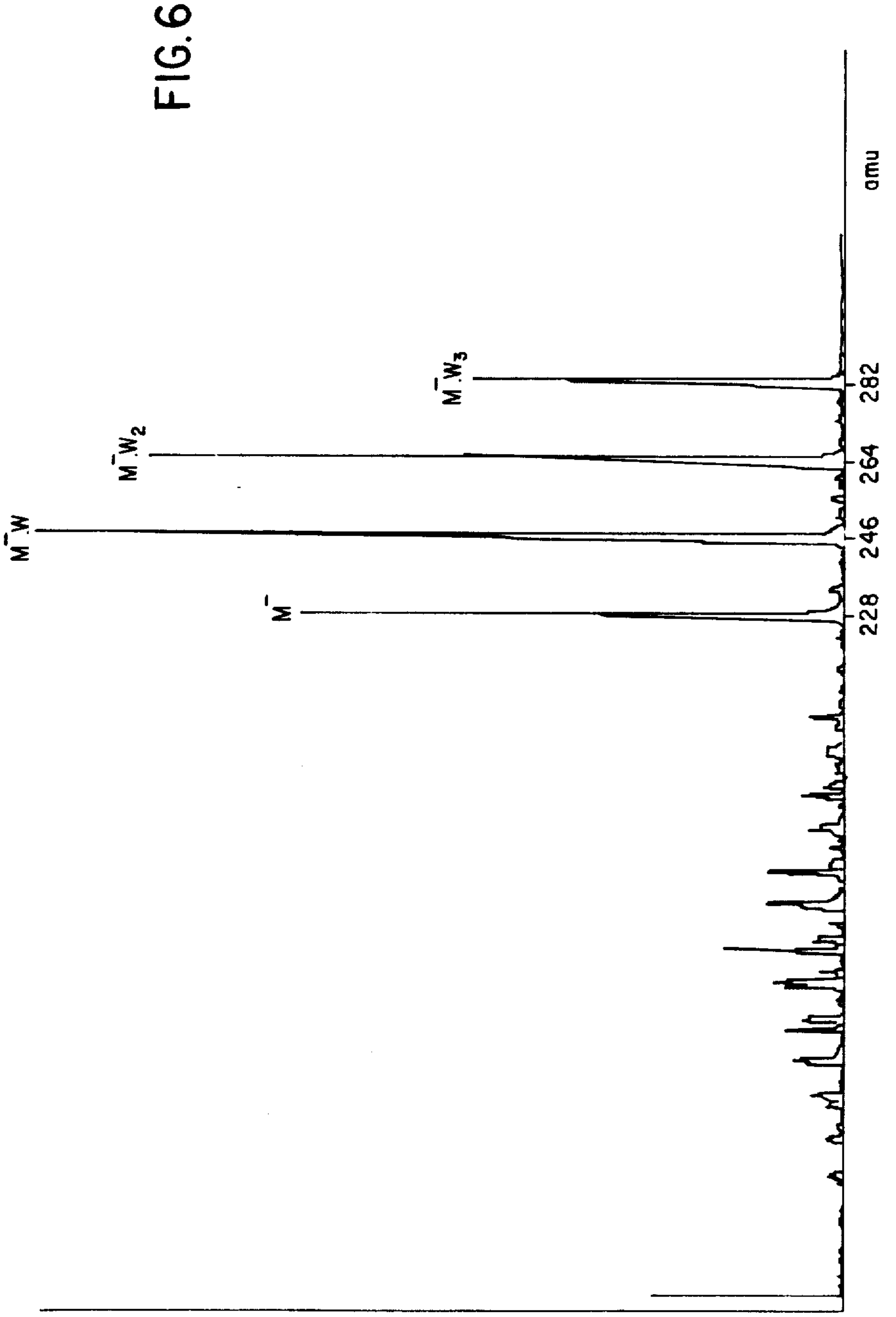
Figure 7:
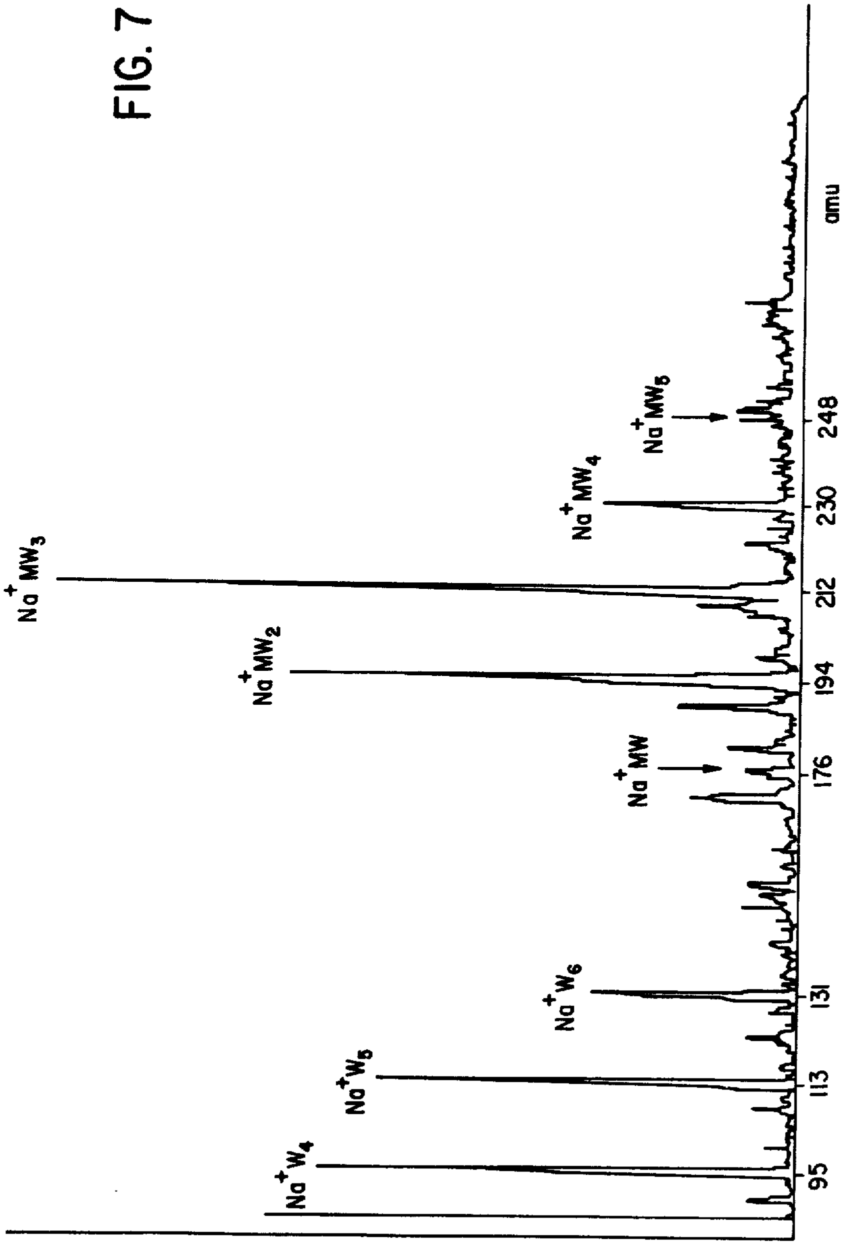

$(NO_2)_3C_6H_2OH$ (picric acid): see FIG. 6.

(c) Non ionic compounds able to evaporate as neutral molecules, clustered around an ion.

As a result of a few exploratory experiments, it has been found that:

Urea, glycerine, benzophenone—evaporate with $Na^+$

Acetanilide, glucose—evaporate with $Br^-$. See FIG. 7.

We claim:

1. A method for analysis of chemical compounds comprising forming at or near normal room temperature a fine droplet spray of a solution containing the compound to be detected and analyzed, electrically charging the spray droplets and allowing said spray to evaporate such that either ionized molecules or atoms of the compound of interest or the neutral species attached to another ion are ejected into the air, introducing the ions which may or may not be clustered with neutral solvent molecules into a mass spectrometer, and obtaining mass spectrum a read-out indicative of the chemical compound is obtained.

2. A method for analysis as in claim 1 where the solution containing the compound is sprayed into a gas at or close to atmospheric pressure.

3. A method for analysis of chemical compounds as in claim 1 wherein the chemical compound to be tested is brought into the form of an aqueous solution.

4. A method for analysis of chemical compounds as in claim 1 wherein the spray droplets are charged by induction of means of an induction electrode at high electrical potential.

5. A method for analysis of chemical compounds as in claim 1 wherein the ionized molecules or atoms are introduced into the mass spectrometer through a region or curtain of purified dry gas.

* * * * *